(12) United States Patent
Emmerich

(10) Patent No.: US 6,173,347 B1
(45) Date of Patent: Jan. 9, 2001

(54) PROCESS AND ARRANGEMENT FOR TRANSMITTING SYSTEM-SPECIFIC DATA IN A SYNCHRONOUS MICROPROCESSOR SYSTEM

(75) Inventor: Norbert Emmerich, Bocholt (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/142,672

(22) PCT Filed: Mar. 12, 1997

(86) PCT No.: PCT/DE97/00491
§ 371 Date: Sep. 11, 1998
§ 102(e) Date: Sep. 11, 1998

(87) PCT Pub. No.: WO97/34238
PCT Pub. Date: Sep. 18, 1997

(30) Foreign Application Priority Data

Mar. 13, 1996 (DE) .............................. 196 09 883

(51) Int. Cl.[7] .................................................. G06F 13/42
(52) U.S. Cl. ..................... 710/105; 710/104; 710/106; 713/600
(58) Field of Search .................................... 710/104–105, 710/106–107, 129, 200, 220; 713/500, 600

(56) References Cited

U.S. PATENT DOCUMENTS

| | | | |
|---|---|---|---|
| 4,958,277 | 9/1990 | Hill et al. ............................ | 364/200 |
| 5,376,928 | * 12/1994 | Testin ................................ | 340/825.5 |
| 5,873,033 | * 2/1999 | Hjern et al. ........................ | 455/417 |

FOREIGN PATENT DOCUMENTS

| | | |
|---|---|---|
| 0 693 729 A1 | 1/1996 | (EP) . |
| WO 95/05040 | 2/1995 | (WO) . |

OTHER PUBLICATIONS

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.
ETSI—Publication, Apr. 1995, prETS 300444, Generic Access Profile, pp. 1–129.
Electronics/Nov. 3, 1983, R. Brawner, "Expanding the I/O facilities of the 8051 microcomputer," pp. 162–163.
IEEE Communications Magazine, Jan. 1995, David D. Falconer et al, Time Division Multiple Access Methods for Wireless Personal Communications, pp. 50–57.

\* cited by examiner

*Primary Examiner*—Ayaz R. Sheikh
*Assistant Examiner*—Raymond N Phan
(74) *Attorney, Agent, or Firm*—Schiff Hardin & Waite

(57) ABSTRACT

The process and arrangement enable the target-oriented and thereby collision-free transmission of data (addressing and useful data) via a synchronous system bus ($SB_{syn}$) in a microprocessor system ($\mu PS$), given data accesses of a microprocessor ($\mu P$) of the microprocessor system ($\mu PS$) to peripheral apparatuses (SP, DAC, AE) of the microprocessor (e.g. a memory, a digital-analog circuit, a display) that are system-compatible and system-incompatible with respect to data transmission protocols (e.g. I²C protocol). A control signal (SS), e.g. fashioned as a chip select signal, is transmitted on a separate control line (SL) between the microprocessor ($\mu P$) and the system-incompatible apparatus (AE) for the selection of the system-compatible and system-incompatible peripheral apparatuses (SP, DAC, AE) of the microprocessor ($\mu P$). Free addresses are respectively assigned to the system-compatible and the system-incompatible apparatuses (SP, DAC, AE).

18 Claims, 4 Drawing Sheets

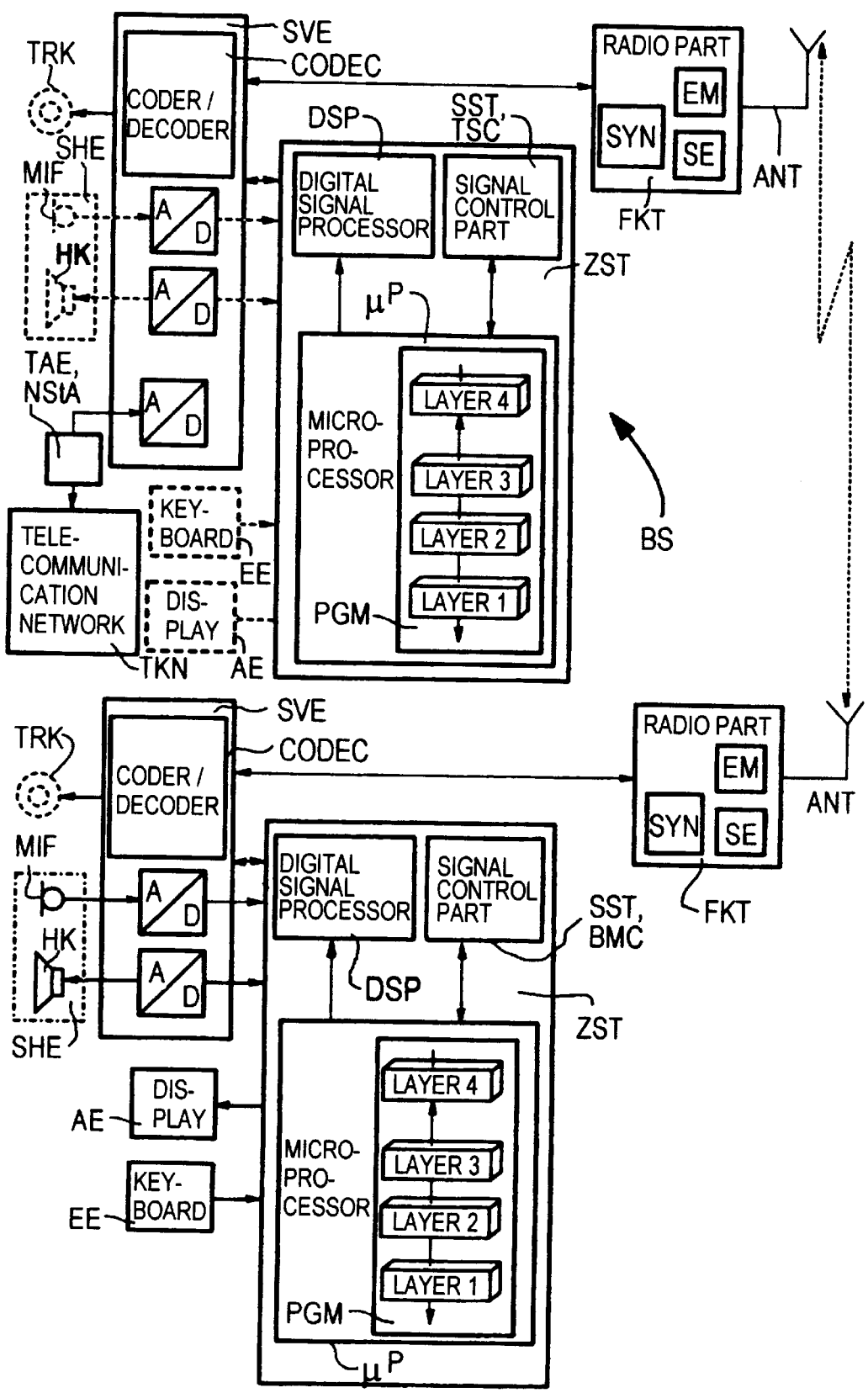

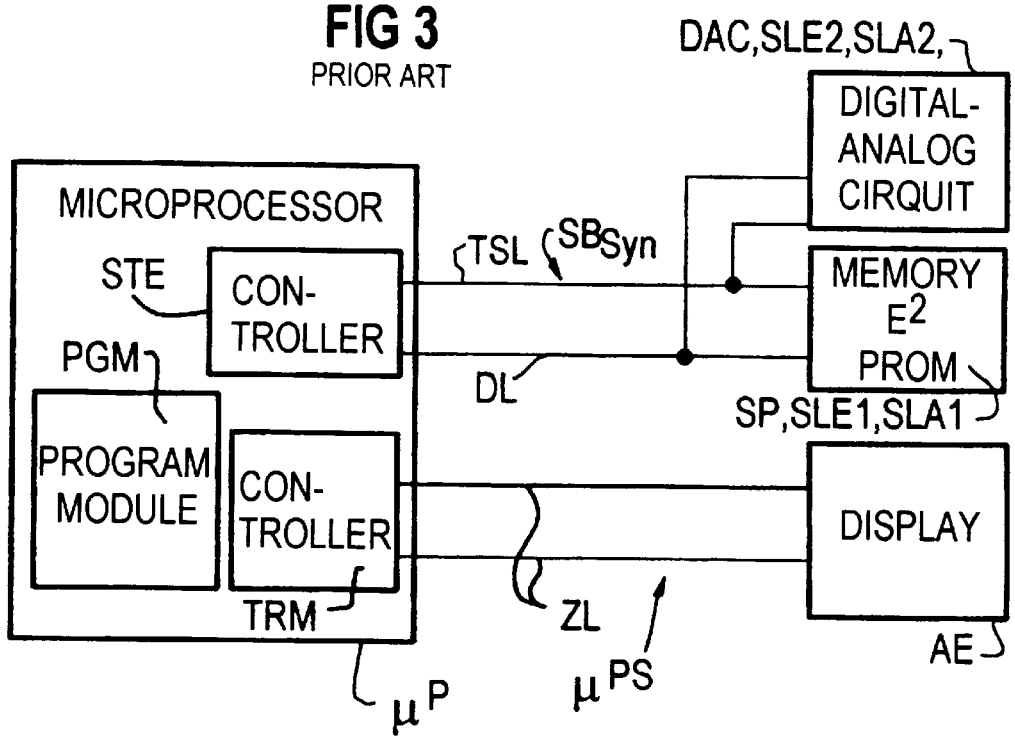
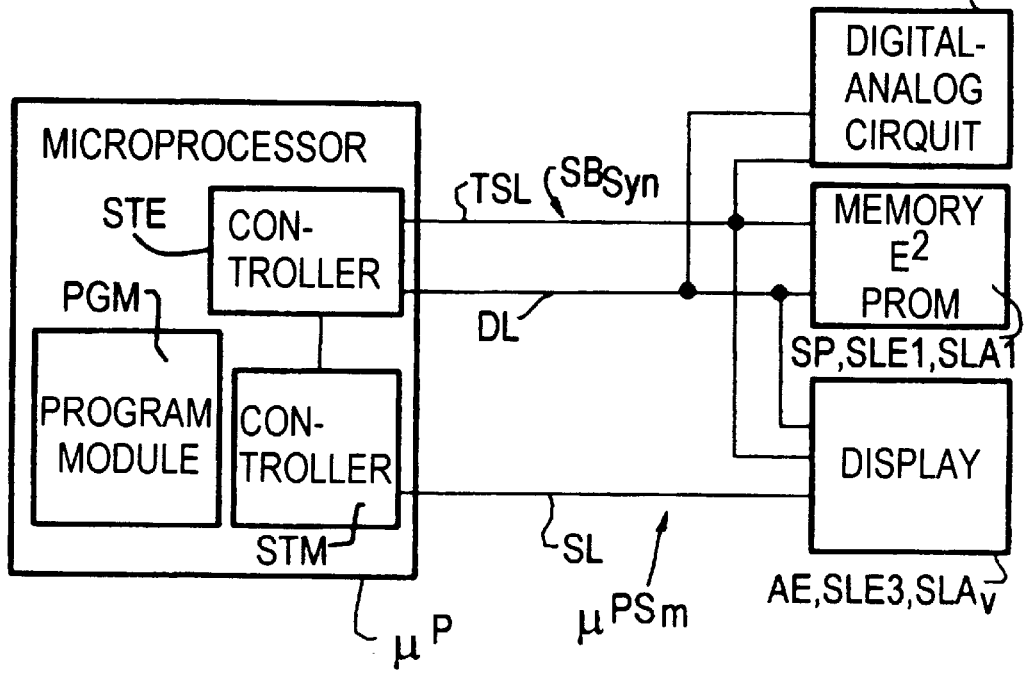

PROCESS AND ARRANGEMENT FOR TRANSMITTING SYSTEM-SPECIFIC DATA IN A SYNCHRONOUS MICROPROCESSOR SYSTEM

BACKGROUND OF THE INVENTION

The invention relates to a method for transmitting system-specific data in a synchronous microprocessor system, and an arrangement for transmitting the system-specific data in the synchronous microprocessor system.

A microprocessor system is the functional unit consisting of a microprocessor, a memory, and a control unit for peripheral equipment, said system being respectively built into a multiplicity of technical apparatuses. The microprocessor is thereby a universally applicable and freely programmable functional unit designated the central unit (Central Processing Unit CPU), and which contains the complete control and computing unit of the microprocessor system and is housed on or more integrated circuits (chip). The term peripheral equipment refers to such devices as can be connected to the microprocessor. The peripheral apparatuses of the microprocessor are divided, according to their function, into peripheral memory equipment, input/output peripheral equipment, and peripheral control equipment. The peripheral memory equipment thereby includes devices provided for the storage of extensive databases, e.g. magnetic layer storage units and magnetic bubble memories. The input/output peripheral equipment includes functional units for the input and output of data, e.g. printer, monitor, etc. The peripheral control equipment includes apparatuses that supply peripheral input/output equipment with control signals (apparatus management).

The microprocessor system indicated above is used for example in telecommunication terminal equipment of wireless telecommunication systems.

Wireless telecommunication systems of the type designated above are message systems with a remote data transmission path between a message source and a message sink for message processing and message transmission, in which
1) the message processing and message transmission can take place in a preferred direction of transmission (Simplex operation) or in both directions of transmission (duplex operation),
2) the message processing is analog or digital,
3) the message transmission via the remote data transmission path is wireless—e.g. according to various radio standards such as DECT, GSM, WACS or PACS, IS-54, PHS, PDC, etc. (cf. IEEE Communications Magazine, January 1995, pages 50–57; D. D. Falconer et al: "Time Division Multiple Access Methods for Wireless Personal Communications").

"Message" is a higher-order term that stands both for the meaning content (information) and also for the physical representation (signal).
Signals can thereby represent e.g.
(1) images
(2) spoken words
(3) written words
(4) encrypted words or images.

FIG. 1 shows, as a representative of the large number of wireless telecommunication systems, a DECT/GAP system in which, according to the DECT/GAP standard (Digital European Cordless Telecommunication; cf. (1): Nachrichtentechnik Elektronik 42 (1992) January/February no. 1, Berlin, DE; U. Pilger "Struktur des DECT-Standards," pp. 23 to 29 in connection with ETSI publication ETS 300175-1 . . . , Oct. 9, 1992; (2): Telcom Report 16 (1993), no. 1, J. H. Koch: "Digitaler Komfort für schnurlose Telekommunikation—DECT-Standard eröffmet neue Nutzungsgebiete", pages 26 and 27; (3): tec 2/93—Das technische Magazin von Ascom "Wege zur universellen mobilen Telekommunikation", pages 35 to 42; Generic Access Profile; cf. ETSI Publication prETS 300444, April 1995, Final Draft, ETSI, FR), at a DECT/GAP base station BS, via a DECT/GAP air interface designed for the frequency range between 1.88 and 1.90 Ghz, a maximum of twelve connections according to the TDMA/FDMA/TDD method (Time Division Multiple Access/Frequency Division Multiple Access/Time Division Duplex) are set up parallel to DECT/GAP mobile parts MT1 . . . MT12. The number 12 results from a number "k" of time slots or, respectively, telecommunication channels provided for the duplex operation of a DECT/GAP system (k=12). The connections can thereby be internal and/or external. Given an internal connection, two mobile parts registered at the base station BS, e.g. the mobile part MT2 and the mobile part MT3, can communicate with one another. For the setup of an external connection, the base station BS is connected with a telecommunication network TKN, e.g. in line-bound form via a telecommunication terminal unit TAE, or, respectively, a private branch exchange NStA, with a line-bound telecommunication network, or, according to WO 95/05040, in wireless form as a repeater station with a higher-order telecommunication network. Given the external connection, with a mobile part, e.g. with the mobile part MT1, it is possible to communicate with a subscriber in the telecommunication network TKN via the base station BS, the telecommunication terminal unit TAE, or, respectively, the private branch exchange NStA. If, as in the case of the Gigaset 951 (Siemens cordless telephone, cf. Telcom Report 16, 1993, no. 1, pages 26 and 27), the base station BS has only one terminal to the telecommunication terminal unit TAE or, respectively, to the private branch exchange NStA, then only one external connection can be set up. If, as in the case of the Gigaset 952 (Siemens cordless telephone, cf. Telcom Report 16, 1993, no. 1, pages 26 and 27), the base station BS has two terminals to the telecommunication network TKN, then in addition to the external connection with the mobile part MT1 a further external connection from a wire-bound telecommunication terminal apparatus TKE connected to the base station BS is possible. In principle, it is thereby also conceivable that a second mobile part, e.g. the mobile part MT12, instead of the telecommunication terminal apparatus TKE, uses the second terminal for an external connection. According to the subsequently published German Patent Application 195 45 762.5, the mobile parts MT1 . . . MT12 are operated in manual operation (normal operation) with a battery or an accumulator, and in hands-free operation are operated in connection with a charge station connected to a voltage network SPN. The base station, fashioned as a wireless small switching installation, is connected to the voltage network SPN via a network terminal apparatus NAG.

FIG. 2 shows, on the basis of the reference Components 31 (1993), no. 6, pages 215–218; S. Althammer, D. Brückmann: "Hochoptimierte IC's für DECT-Schnurlostelefone," the circuit design of the base station BS and of the mobile part MT. The base station BS and the mobile part comprise, according to the reference, a radio part FKT with an antenna ANT allocated for the transmission and reception of radio signals, a signal processing means SVE, and a central control unit ZST, connected with one another in the manner shown. In the radio part FKT, essentially the known means, such as transmitter SE, receiver EM, and synthesizer SYN, are contained. Among other things, a coding/decoding means CODEC is contained in the signal processing means SVE. The central control unit ZST comprises, both for the base station BS and also for the mobile part MT, a microprocessor μP, having a program module PGM constructed according to the OSI/ISO layer model, a signal control part SST, and a digital signal processor DSP, connected with one another in the manner shown. Of the layers defined in the layer model, only the first four layers, immediately essential for the base station BS and the mobile part MT, are shown. The signal control part SST is fashioned in the base station BS as a time switch controller TSC and in the mobile part MT as a burst mode controller BMC. The essential difference between the two signal control parts TSC, BMC is that the base-station-specific signal control part TSC takes over additional switching functions in relation to the mobile-part-specific signal control part BMC. The microprocessor μP is, according to the definition indicated above, a component of a microprocessor system.

The principle of the functioning of the switching units indicated above is described for example in the above-cited reference Components 31 (1993), no. 6, pages 215–218.

The specified circuit design according to FIG. 2 is supplemented in the base station BS and the mobile part MT by additional functional units according to their function in the DECT/GAP system according to FIG. 1.

The base station BS is connected with the telecommunication network TKN via the signal processing means SVE and the telecommunication terminal unit TAE or, respectively, the private branch exchange NStA. As an option, the base station BS can also comprise a user interface (functional units drawn in with dotted lines in FIG. 2), consisting for example of an input means EE fashioned as a keyboard, a display means AE fashioned as a display, a speech/hearing means SHE fashioned as a handset with microphone MIF and earpiece HK, as well as a tone call bell TRK.

The mobile part MT comprises the user interface, possible as an option in the base station BS, with the above-described operating elements belonging to this user interface.

FIG. 3 shows a synchronous microprocessor system μPS, in which for example the microprocessor μP according to FIG. 2 is connected with external peripheral equipment via a synchronous system bus $SB_{syn}$ for data transmission. The external apparatuses are for example a memory SP fashioned as a E²PROM and a digital-analog circuit DAC. The known functioning of these external apparatuses in connection with the microprocessor μP is not discussed in more detail.

The transmission of the data (addressing and useful data) between the microprocessor μP and the external apparatuses SP, DAC on the synchronous system bus $SB_{syn}$ takes place in chronologically synchronized fashion or, respectively, according to a predetermined data transmission pulse. For this purpose, the system bus $SB_{syn}$ comprises two lines, a clock signal line TSL and a data line DL. The data are thereby transmitted according to an agreed-upon system-specific protocol, which is in principle freely selectable. In the present case, this protocol is, according to the reference Funk-Technik 39 (1984), No. 4, pages 162 through 166; Schmidt, W. P.: "Bussysteme-Verbindungen zwischen Zentral- und Peripherieschaltungen," the I²C protocol, in which, according to FIG. 4, a START-Bit, an apparatus-specific address, the data, and a STOP-Bit are transmitted in the sequence named. For this protocol-specific transmission of the data, the microprocessor μP comprises a control means STE (controller), which correspondingly supports the data transmission on the synchronous system bus $SB_{syn}$ fashioned as an I²C bus as a result of the agreed-upon protocol.

The above-specified arrangement "Microprocessor←→external apparatuses" can be regarded as a master-slave configuration, in which the microprocessor μP can be designated the master apparatus ME and the memory SP can be designated the first slave apparatus SLE1 with a first slave address SLA1 for the addressing, and the digital-analog circuit DAC can be designated as the second slave apparatus SLE2 with a second slave address SLA2 for the addressing. Within this master-slave configuration defined in this way, there are no compatibility problems between "master" and "slave/slaves," so that the two slave apparatuses SLE1, SLE2 are compatible with the master apparatus ME, i.e., are system-compatible.

FIG. 4 shows the signal curves that occur according to the I²C specification on the clock signal line TSL and on the data line DL. After the transmission of the START-Bits, the slave address SLA1, SLA2 is sent. This is recognized by the memory SP and the digital-analog circuit DAC as their own, so that, in accordance with sequence, the subsequently transmitted data are interpreted/received by the memory SP and the digital-analog circuit DAC.

If a further external (peripheral) apparatus, e.g. a display means AE fashioned as a display, should in addition be allocated to the microprocessor μP that proves to be system-incompatible in the sense of the above nomenclature, it was previously standard to connect this incompatible display means AE with the microprocessor μP via separate additional lines ZL between the microprocessor μP and the display means AE and program-supported driver means TRM.

From the reference Electronics/Nov. 3, 1983, pages 162 and 163; R. Brawner, "Expanding the I/O facilities of the 8051 microcomputer," a data transmission method and an arrangement therefor are specified in which the apparatuses connected to the bus are activated on respectively allocated control lines by means of "chip select" items of information.

The underlying object of the invention is that, in a synchronous microprocessor system, an apparatus that is system-incompatible in relation to the system-specific data transmission can be supplied with apparatus-specific data in a simple manner without an additional hardware outlay at the microprocessor.

In general terms the present invention is a method for transmitting system-specific data in a synchronous microprocessor system. Addressing data and useful data are transmitted between a microprocessor and at least one system-compatible system-specific apparatus, as well as at least one system-incompatible system-specific apparatus, on a first line. Clock signals are transmitted on a second line, the first and second lines forming a system bus. First addressing data and first useful data destined for the system-compatible apparatus are transmitted on the first line. Second addressing data and second useful data destined for the system-incompatible apparatus are transmitted on the first line. Third addressing data, likewise destined for the system-incompatible apparatus, is transmitted on a control line between the microprocessor and the system-incompatible apparatus. Free addresses are respectively assigned to the system-compatible apparatus and to the system-incompatible apparatus.

Advantageous developments of the present invention are as follows.

The first addressing data, the second addressing data, the first useful data and the second useful data are transmitted on a I²C bus according to an I²C protocol.

The third addressing data contains chip select information.

The system-compatible apparatus is an E²PROM.

The system-incompatible apparatus is an optical display device.

The method is utilized in a wireless hand apparatus of a wireless telecommunication system that operates according to a DECT/GAP standard.

The method is utilized in a wireless base station of a wireless telecommunication system that operates according to a DECT/GAP standard.

The method is utilized in a mobile radiotelephone hand apparatus of a mobile radiotelephone telecommunication system that operates according to a GSM standard.

The method is utilized in a mobile radiotelephone base station of a mobile radiotelephone telecommunication system that operates according to a GSM standard.

The present invention is also an arrangement for the transmission of system-specific data in a synchronous microprocessor system. The arrangement has the following components:

a microprocessor and at least one system-compatible system-specific apparatus as well as at least one system-incompatible system-specific apparatus, between which addressing data and useful data are transmitted;

a system bus between the microprocessor and the system-compatible apparatus as well as the system-incompatible apparatus, on which first addressing data and first useful data destined for the system-compatible apparatus and second addressing data and second useful data destined for the system-incompatible apparatus are transmitted on a first line, and clock signals are respectively transmitted on a second line;

a control line between the microprocessor and the system-incompatible apparatus, on which third addressing data, likewise destined for the system-incompatible apparatus, is transmitted; and free addresses being respectively assigned to the system-compatible apparatus and to the system-incompatible apparatus.

The underlying idea of the invention is that, on the basis of the microprocessor system indicated in the introduction to the specification and the technical application thereof, in particular in wireless telecommunication systems, given data accesses of a microprocessor of the microprocessor system to peripheral apparatuses of the microprocessor (e.g. a memory, a digital-analog circuit, a display means) that are system-compatible and system-incompatible with respect to data transmission protocols (e.g. I²C protocol), data (addressing and useful data) are transmitted via a synchronous system bus in target-directed and thereby collision-free manner, in that 1) on a separate control line, a control signal, fashioned e.g. as a chip select signal, is transmitted for the selection of the system-compatible and system-incompatible external (peripheral) apparatuses of the microprocessor, and 2) free addresses are respectively assigned to the system-compatible and system-incompatible apparatuses.

This has the advantage that no additional terminal contacts (pins) are required on the microprocessor (simplification of layout in-the chip design of the microprocessor). Moreover, the existing processor performance can be optimally exploited.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 is a block diagram of a prior art base station and mobile part;

FIG. 3 depicts a prior art synchronous microprocessor system;

FIG. 5 shows, on the basis of the known microprocessor system according to FIG. 3, a modified microprocessor system.

DESCRIPTION OF THE PREFERRED EMBODIMENTS

On the basis of the microprocessor system $\mu PS$ according to FIG. 3, FIG. 5 shows a modified microprocessor system $\mu PS_m$, in which the system-incompatible display means AE according to FIG. 3, like the system-compatible memory SP and the system-compatible digital-analog circuit DAC according to FIG. 3, is connected with the microprocessor $\mu P$ via the synchronous system bus $SB_{syn}$ and, in addition, via a single control line SL. In this way, the program-supported driver means TRM in the microprocessor $\mu P$, required in the known microprocessor system $\mu PS$ according to FIG. 3, can be omitted, and the additional lines ZL can be replaced by the single control line SL.

For the trouble-free operation of the modified microprocessor system $\mu Ps_m$, the following conditions must however be maintained on the synchronous system bus $SB_{syn}$:

a) accesses by the microprocessor $\mu P$ to the system-compatible apparatus(es) (memory SP, digital-analog circuit DAC) must not be interpreted or, respectively, must not be able to be interpreted by the system-incompatible apparatus (display means AE), designated as the third slave means (SLE3).

b) accesses by the microprocessor $\mu P$ to the system-incompatible apparatus(es) (display means AE) must not disturb the system-compatible apparatuses (memory SP, digital-analog circuit DAC).

In order to meet both these conditions, the microprocessor $\mu P$ of the control means STE contains allocated control means STM, fashioned in such a way that a data transmission is possible that is target-directed and thereby collision-free with respect to the accesses. This takes place in that 1) on the control line SL, a control signal SS, fashioned as a chip select signal, is transmitted for the selection of the system-compatible and system-incompatible external (peripheral) means of the microprocessor μP, and 2) a free virtual slave address or addresses $SLA_v$ is/are assigned to the system-incompatible apparatus(es), which address or addresses has/have not yet been allocated to the other apparatuses.

In contrast to the driver means TRM according to FIG. 3, the control means STM require no additional terminal contacts (pins) at the microprocessor μP (simplification of layout in the chip design of the microprocessor). Moreover, the existing control means STE can be used (optimal exploitation of the existing processor performance).

Figure 1:
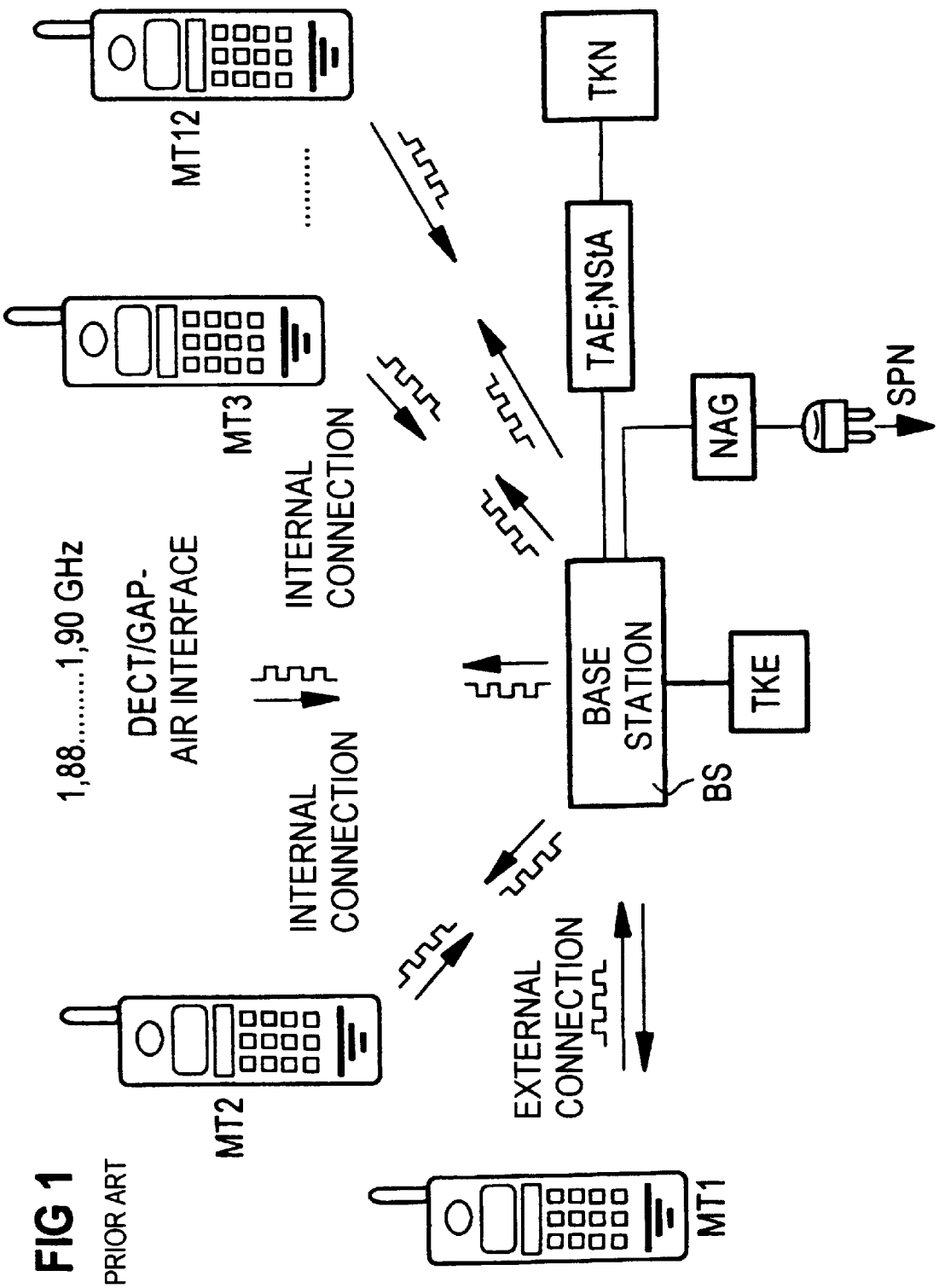
FIG. 1 depicts a prior art DECT/GAP system.
Figure 4:
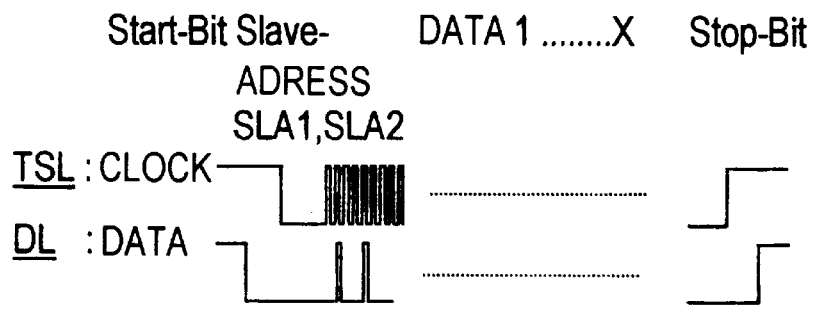
FIG. 4 shows signal curves in the FIG. 3 system.
Figure 6:
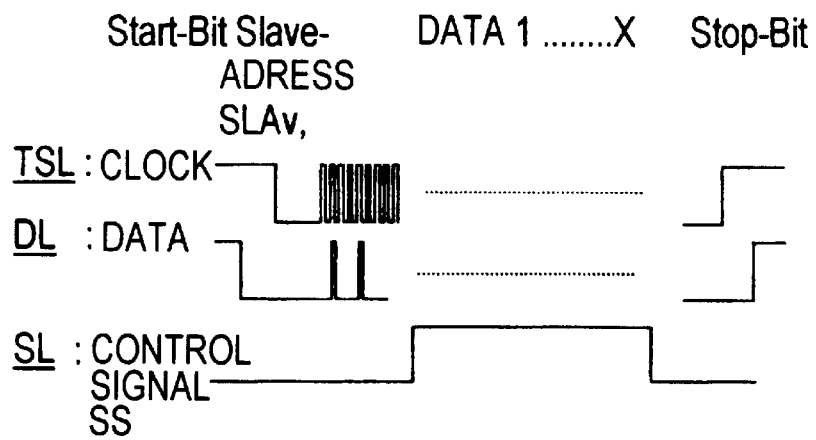
FIG. 6 shows the signal curves that occur according to the I²C specification on the clock signal line and the data line according to FIG. 5 for the data transmission between the microprocessor and the display means.

On the basis of FIG. 4, FIG. 6 shows the signal curves that occur according to the I²C specification on the clock signal line TSL and the data line DL according to FIG. 5 for the data transmission between the microprocessor μP and the display means AE. After the transmission of the start bit, the virtual slave address $SLA_v$ is sent. This is not recognized by the memory SP and the digital-analog circuit DAC as their own, so that consequently the subsequently transmitted data are not interpreted/received by the memory SP and the digital-analog circuit DAC. If the control signal SS is sent after the transmission of the virtual slave address $SLA_v$ and before the data transmission on the control line SL (setting of the chip select signal to HIGH potential), the system-incompatible display means AE is thereby activated for the reception of the data subsequently transmitted on the system bus $SB_{syn}$.

Figure 7:
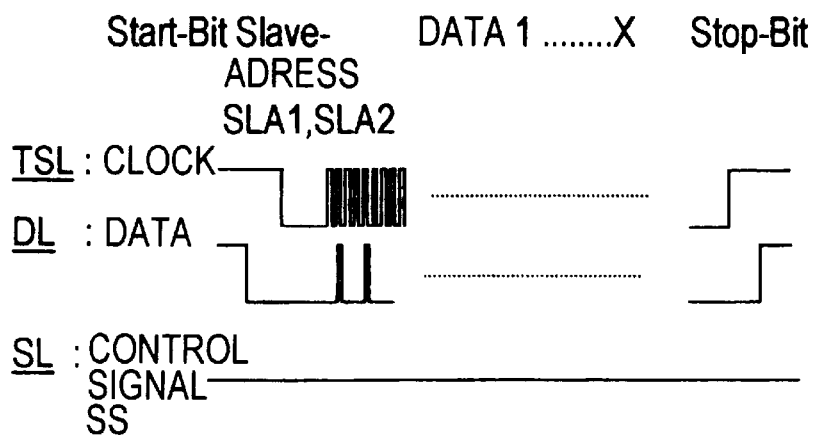
FIG. 7 shows the signal curves that occur according to the I²C specification on the clock signal line and the data line according to FIG. 5 for the data transmission between the microprocessor and the memory or, respectively, digital-analog circuit.

On the basis of FIG. 4, FIG. 7 shows the signal curves occurring according to the I²C specification on the clock signal line TSL and the data line DL according to FIG. 5 for the data transmission between the microprocessor μP and the memory SP or, respectively, the digital-analog circuit DAC. The response of the system-compatible memory SP or, respectively, of the system-compatible digital-analog circuit DAC takes place as in FIG. 4. Due to the fact that the control signal SS is not sent on the control line SL (chip select signal at LOW potential), the system-incompatible display means AE is not activated. The subsequently transmitted data on the clock signal line TSL and the data line DL are thus not interpreted or, respectively, received by the display means AE.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting system-specific data in a synchronous microprocessor system, comprising the steps of:
    a) transmitting addressing data and useful data between a microprocessor and at least one system-compatible system-specific apparatus, as well as at least one system-incompatible system-specific apparatus, on a first line, and transmitting clock signals to both said system-compatible system-specific apparatus and said system-incompatible system-specific apparatus on a second line, the first and second lines forming a system bus;
    b) transmitting first addressing data and first useful data destined for the system-compatible apparatus on the first line;
    c) transmitting second addressing data and second useful data destined for the system-incompatible apparatus on the first line, and transmitting third addressing data, likewise destined for the system-incompatible apparatus, on a control line between the microprocessor and the system-incompatible apparatus; and
    d) respectively assigning free addresses to the system-compatible and to the system-incompatible apparatus.

2. The method according to claim 1, wherein the first addressing data, the second addressing data, the first useful data and the second useful data are transmitted on a I²C bus according to an I²C protocol.

3. The method according to claim 1, wherein the third addressing data contains chip select information.

4. The method according to claim 1, wherein the system-compatible apparatus is an E²PROM.

5. The method according to claim 1, wherein the system-incompatible apparatus is an optical display device.

6. The method according to claim 1, wherein the method is utilized in a wireless hand apparatus of a wireless telecommunication system that operates according to a DECT/GAP standard.

7. The method according to claim 1, wherein the method is utilized in a wireless base station of a wireless telecommunication system that operates according to a DECT/GAP standard.

8. The method according to claim 1, wherein the method is utilized in a mobile radiotelephone hand apparatus of a mobile radiotelephone telecommunication system that operates according to a GSM standard.

9. The method according to claim 1, wherein the method is utilized in a mobile radiotelephone base station of a mobile radiotelephone telecommunication system that operates according to a GSM standard.

10. An arrangement for the transmission of system-specific data in a synchronous microprocessor system, comprising:
    a microprocessor and at least one system-compatible system-specific apparatus as well as at least one system-incompatible system-specific apparatus, between which addressing data and useful data are transmitted;
    a system bus between the microprocessor and the system-compatible apparatus as well as the system-incompatible apparatus, on which first addressing data and first useful data destined for the system-compatible apparatus and second addressing data and second useful data destined for the system-incompatible apparatus are transmitted on a first line, and clock signals to both said system-compatible system-specific apparatus and said system-incompatible system-specific apparatus are respectively transmitted on a second line;
    a control line between the microprocessor and the system-incompatible apparatus, on which third addressing data, likewise destined for the system-incompatible apparatus, is transmitted; and
    free addresses being respectively assigned to the system-compatible apparatus and to the system-incompatible apparatus.

11. The arrangement according to claim 10, wherein the system bus is an I²C bus, on which the first addressing data, the second addressing data, the first useful data and the second useful data are transmitted according to an I²C protocol.

12. The arrangement according to claim 10, wherein the third addressing data contain chip select information.

13. The arrangement according to claim 10, wherein the system-compatible apparatus is an $E^2$PROM.

14. The arrangement according to claim 10, wherein the system-incompatible apparatus is an optical display device.

15. The arrangement according to claim 10, wherein the arrangement is utilized in a wireless hand apparatus of a wireless telecommunication system constructed according to a DECT/GAP standard.

16. The arrangement according to claim 10, wherein the arrangement is utilized in a wireless base station of a wireless telecommunication system constructed according to a DECT/GAP standard.

17. The arrangement according to claim 10, wherein the arrangement is utilized in a mobile radiotelephone hand apparatus of a mobile radiotelephone telecommunication system constructed according to a GSM standard.

18. The arrangement according to claim 10, wherein the arrangement is utilized in a mobile radiotelephone base station of a mobile radiotelephone telecommunication system constructed according to a GSM standard.

* * * * *